United States Patent
Usuda et al.

(10) Patent No.: US 7,586,977 B2
(45) Date of Patent: Sep. 8, 2009

(54) TRANSMISSION POWER CONTROL METHOD, MOBILE STATION, AND RADIO NETWORK CONTROLLER

(75) Inventors: Masafumi Usuda, Yokosuka (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 575 days.

(21) Appl. No.: 11/307,974

(22) Filed: Mar. 1, 2006

(65) Prior Publication Data

US 2007/0189224 A1    Aug. 16, 2007

(30) Foreign Application Priority Data

Mar. 1, 2005    (JP)    ............................ P2005-056631

(51) Int. Cl.
*H04L 27/30* (2006.01)
(52) U.S. Cl. ................. 375/146; 375/141; 370/318; 455/13.4; 455/522; 455/127.1
(58) Field of Classification Search ................. 375/140, 375/141, 146, 147, 220, 260; 370/318, 320, 370/342, 441, 464, 465, 479; 455/13.4, 522, 455/69, 115.1, 127.1
See application file for complete search history.

(56) References Cited

U.S. PATENT DOCUMENTS

| | | | | |
|---|---|---|---|---|
| 6,882,857 B2 * | 4/2005 | Zhang et al. | ................. | 455/522 |
| 6,950,420 B2 * | 9/2005 | Sarkkinen et al. | ............ | 370/338 |
| 7,373,164 B2 * | 5/2008 | Iacono et al. | ................ | 455/522 |

FOREIGN PATENT DOCUMENTS

| | | | |
|---|---|---|---|
| EP | 1 244 232 A1 | 9/2002 |
| EP | 1 473 849 A1 | 11/2004 |
| EP | 1 679 803 A2 | 7/2006 |

OTHER PUBLICATIONS

3GPP TSG RAN WGI Metting #40; R1-050215; Scottsdale, AZ, USA, Feb. 14-18, 2005; Title: Gain factor setting for E-DCH; Source: Samsung, Nokia, Philips.
3GPP TS25.309 V6.1.0 (Dec. 2004) 3rd Generation Partnership Project; Technical Specification Group Radio Access Network; FEE Enhanced Upling; Overall description; Stage 2.

* cited by examiner

*Primary Examiner*—Dac V Ha
(74) *Attorney, Agent, or Firm*—Marvin A. Motsenbocker; MOTS Law, PLLC

(57) ABSTRACT

A transmission power control method for controlling transmission power of an enhanced dedicated physical data channel for transmitting uplink user data, includes: storing, at a mobile station, a reference transmission format including a transmission data block size which is used in the enhanced dedicated physical data channel, and a gain factor which is a transmission power ratio between the enhanced dedicated physical data channel and a dedicated physical control channel or which is a transmission wave amplitude ratio between the enhanced dedicated physical data channel and the dedicated physical control channel, calculating, at the mobile station, a gain factor of a normal transmission format based on the transmission data block size and the gain factor of the reference transmission format and the transmission data block size of the normal transmission format, and controlling, at the mobile station, a transmission power of enhanced dedicated physical data channel based on the gain factor of the reference transmission format or the normal transmission format. Here, a transmission data block size of the reference transmission format is larger than the smallest transmission data block size.

2 Claims, 9 Drawing Sheets

FIG.3

| TRANSMISSION FORMAT NUMBER | TRANSMISSION DATA BLOCK SIZE | GAIN FACTOR [dB] |
|---|---|---|
| 1 | 100 | 1.0 |
| 2 | 200 | 2.0 |
| 3 | 300 | 3.0 |
| 4 | 400 | 4.0 |
| ⋮ | ⋮ | ⋮ |
| n | n×100 | n |

FIG.4

| TRANSMISSION FORMAT NUMBER | TRANSMISSION DATA BLOCK SIZE | GAIN FACTOR [dB] | REFERENCE TRANSMISSION FORMAT NUMBER |
|---|---|---|---|
| 1 | 100 | 1.0 | * |
| 2 | 200 | | 1 |
| 3 | 300 | | 1 |
| 4 | 400 | | 1 |
| 5 | 500 | 5.0 | * |
| 6 | 600 | | 5 |
| 7 | 700 | | 5 |
| 8 | 800 | | 5 |
| ⋮ | ⋮ | ⋮ | ⋮ |

| TRANSMISSION FORMAT NUMBER | TRANSMISSION DATA BLOCK SIZE | GAIN FACTOR [dB] | REFERENCE TRANSMISSION FORMAT NUMBER |
|---|---|---|---|
| 1 | 100 | | 3 |
| 2 | 200 | | 3 |
| 3 | 300 | 3.0 | * |
| 4 | 400 | | 3 |
| 5 | 500 | | 3 |
| 6 | 600 | 6.0 | * |
| 7 | 700 | | 6 |
| 8 | 800 | | 6 |
| ⋮ | ⋮ | ⋮ | ⋮ |

TRANSMISSION POWER CONTROL METHOD, MOBILE STATION, AND RADIO NETWORK CONTROLLER

CROSS REFERENCE TO RELATED APPLICATION

This application is based upon and claims the benefit of priority from the prior Japanese Patent Application No. P2005-056631, filed on Mar. 1, 2005; the entire contents of which are incorporated herein by reference.

BACKGROUND OF THE INVENTION

1. Field of the Invention

The present invention relates to a transmission power control method for controlling transmission power of an enhanced dedicated physical data channel for transmitting uplink user data, a mobile station, and a radio network controller.

2. Description of the Related Art

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional radio network controller RNC, there has been also a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 2(a), the data are transmitted by accepting low-speed, high-delay, and low-transmission efficiency as shown in FIG. 2(b), or, as shown in FIG. 2(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2(b) and 2(c).

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

In "Enhanced Uplink", a MAC-layer function, which is implemented in a radio base station Node B, is configured to control a transmission rate of uplink user data transmitted by a mobile station UE, using two transmission rate control channels described below. (See, Non-Patent literature 1:3GPP TS25.309 v6.1.0)

As a first transmission rate control channel, an "Absolute Rate Grant Channel (AGCH)" is used for controlling the transmission rate of uplink user data.

The AGCH transmits, from the MAC-layer function located in each cell of the radio base station Node B, an absolute value for a maximum allowable transmission rate of uplink user data (or parameter relating to the maximum allowable transmission rate) to each mobile station UE (individual mobile stations or all mobile stations).

Here, the above-described parameter relating to the maximum allowable transmission rate is a transmission power ratio between an "Enhanced Dedicated Physical Data Channel (E-DPDCH)" and a "Dedicated Physical Control Channel (DPCCH)" (i.e., transmission power of E-DPDCH/transmission power of DPCCH) and the like.

The increase/decrease of the parameter relating to the maximum allowable transmission rate is corresponding to the increase/decrease of the maximum allowable transmission rate, and it is acquired in connection with the maximum allowable transmission rate.

As a second transmission rate control channel, a "Relative rate Grant Channel (RGCH)" is used for controlling the transmission rate of uplink user data.

The RGCH transmits, from the MAC-layer function located in each cell of the radio base station Node B, a downlink command indicating relative values such as an "Up Command", a "Down Command", a "Keep Command", or the like, for a maximum allowable transmission rate of uplink user data (or parameter relating to the maximum allowable transmission rate) to each mobile station UE (individual mobile stations or all mobile stations).

Firstly, when the mobile station UE transmits uplink user data, the mobile station UE determines a maximum allowable transmission rate of uplink user data in the mobile station UE (or a transmission power ratio between the E-DPDCH and the DPCCH, or the like) using the AGCH and the RGCH.

Secondly, the mobile station UE determines a transmission data format (transmission data block size, or the like) for transmitting uplink user data, based on the buffer residence transmission data size in the mobile station UE.

Thirdly, the mobile station UE determines the transmission power ratio between the E-DPDCH for transmitting uplink user data and the DPCCH, or a transmission wave amplitude ratio between the E-DPDCH and the DPCCH, based on the determined transmission data format (hereinafter, a gain factor).

As shown in FIG. 3, the gain factor and the transmission format number is corresponding on a one-on-one basis. The radio network controller RNC is configured to notify a gain factor correspondence table to the mobile station UE, when a call connection is performed. In the gain factor correspondence table, as shown in FIG. 3, the transmission format number and the gain factor is corresponding. In order to notify the gain factor correspondence table, from the radio network controller RNC to the mobile station UE, two schemes have been proposed.

The first scheme is a "Signaled Gain Factor". When the "Signaled Gain Factor" is applied, the radio network controller RNC notifies the gain factors to be set in all of the transmission formats.

The second scheme is a "Computed Gain Factor" (See, FIG. 4). When the "Computed Gain Factor" is applied, the radio network controller RNC notifies the gain factors to be set in one or a plurality of transmission formats. Here, the transmission formats to which the gain factor to be set is notified is called as a "Reference transmission format".

A transmission format except for the reference transmission format is called as a "Normal transmission format". When the normal transmission format is used, the mobile station UE is configured to calculate a gain factor of the normal transmission format, by using the gain factor of the reference transmission format and a predetermined calculating formula.

A simple formula for calculating a gain factor of the normal transmission format is to multiply the ratio between a transmission data block size of the normal transmission format and a transmission data block size of the reference transmission format by the gain factor of the reference transmission format.

As described in a Non-Patent literature 2 (3GPP TSG RAN WG1 R1-050215), in the conventional method, a gain factor of a normal transmission format is calculated using a reference transmission format having a maximum transmission data block size among reference transmission formats having a transmission data block size smaller than the transmission data block size of the normal transmission format, when acquiring the gain factor of the normal transmission format.

Therefore, as shown in FIG. 4, the transmission format having a smallest transmission data block size has to be the reference transmission format. Thus, in FIG. 4, a transmission format number for reference referring to "*" is the reference transmission format.

However, the transmission format having the smallest transmission data block size can not get an error correction encoding benefit, therefore a transmission power for the transmission format having the smallest transmission data block size have to be set higher per one bit, compared with a transmission format having other larger transmission data block size.

Therefore, in order to set appropriate transmission power, and to increase a transmission efficiency, a transmission data block size of the reference transmission format having a second smallest transmission data block size needed to be smaller.

For the above reason, there has been a problem that the reference transmission formats have to be provided closely, otherwise an excessive gain factor is used for transmitting by using a transmission format having a relatively large transmission data block size.

In other words, there is a problem that an increase of a volume of control signals, an increase of complexity of hardware, an increase of test operations, and an increase of system operations occurs, because a lot of reference transmission formats are set.

BRIEF SUMMARY OF THE INVENTION

The present invention has been made considering the problems, and its object is to provide a transmission power control method, a mobile station and a radio network controller, which enable a reduction of complexity of hardware, a reduction of test operations, and a reduction of system operations, even if a gain factor correspondence table, which is generated by using the "Computed Gain Factor" scheme, is used.

A first aspect of the present invention is summarized as a transmission power control method for controlling transmission power of an enhanced dedicated physical data channel for transmitting uplink user data, including: storing, at a mobile station, a reference transmission format including a transmission data block size which is used in the enhanced dedicated physical data channel, and a gain factor which is a transmission power ratio between the enhanced dedicated physical data channel and a dedicated physical control channel or which is a transmission wave amplitude ratio between the enhanced dedicated physical data channel and the dedicated physical control channel, calculating, at the mobile station, a gain factor of a normal transmission format based on the transmission data block size and the gain factor of the reference transmission format and the transmission data block size of the normal transmission format, and controlling, at the mobile station, the transmission power of the enhanced dedicated physical data channel based on the gain factor of the reference transmission format or the normal transmission format. Here, a transmission data block size of the reference transmission format is larger than the smallest transmission data block size.

In addition, in the first aspect of the invention, the mobile station can store the reference transmission format based on control information from a radio network controller.

In addition, in the first aspect of the invention, the mobile station can calculate a gain factor of the normal transmission format having the transmission data block size smaller than the transmission data block size of the reference transmission format having a second smallest transmission data block size, based on the reference transmission format having the smallest transmission data block size.

A second aspect of the present invention is summarized as a mobile station used in a transmission power control method for controlling transmission power of an enhanced dedicated physical data channel for transmitting uplink user data, including: a storing section configured to store, at a mobile station, a reference transmission format including a transmission data block size which is used in the enhanced dedicated physical data channel, and a gain factor which is a transmission power ratio between the enhanced dedicated physical data channel and a dedicated physical control channel or which is a transmission wave amplitude ratio between the enhanced dedicated physical data channel and the dedicated physical control channel, a gain factor calculating section configured to calculate, at the mobile station, a gain factor of a normal transmission format based on the transmission data block size and the gain factor of reference transmission format and the transmission data block size of the normal transmission format, and a controlling section configured to control, at the mobile station, the transmission power of the enhanced dedicated physical data channel based on the gain factor of the reference transmission format or the normal transmission format. Here, a transmission data block size of the reference transmission format is larger than the smallest transmission data block size.

In addition, in the second aspect of the present invention, the storing section can be configured to store the reference transmission format based on control information from a radio network controller.

In addition, in the second aspect of the invention, the storing section can be configured to calculate a gain factor of the normal transmission format having the transmission data block size smaller than the transmission data block size of the reference transmission format having a second smallest transmission data block size, based on the reference transmission format having the smallest transmission data block size.

A third aspect of the present invention is summarized as a radio network controller used in a transmission power control method for controlling transmission power of an enhanced dedicated physical data channel for transmitting uplink user data, including: a transmission format information transmitting section configured to transmit, to a mobile station, information relating to a reference transmission format including a transmission data block size which is used in the enhanced dedicated physical data channel, and a gain factor which is a transmission power ratio between the enhanced dedicated physical data channel and a dedicated physical control channel or which is a transmission wave amplitude ratio between the enhanced dedicated physical data channel and the dedicated physical control channel. Here, in the mobile station, a transmission data block size of the reference transmission format is larger than the smallest transmission data block size.

BRIEF DESCRIPTION OF THE SEVERAL VIEWS OF THE DRAWINGS

FIG. 3 is a graph for illustrating one example of a gain factor correspondence table used in a conventional "Signaled Gain Factor" method.

FIG. 4 is a graph for illustrating one example of a gain factor correspondence table used in a conventional "Computed Gain Factor" method.

DETAILED DESCRIPTION OF THE INVENTION

Configuration of Mobile Communication System According to First Embodiment of the Present Invention Referring to FIGS. 5 to 14, a configuration of a mobile communication system according to a first embodiment of the present invention will be described.

Figure 1:
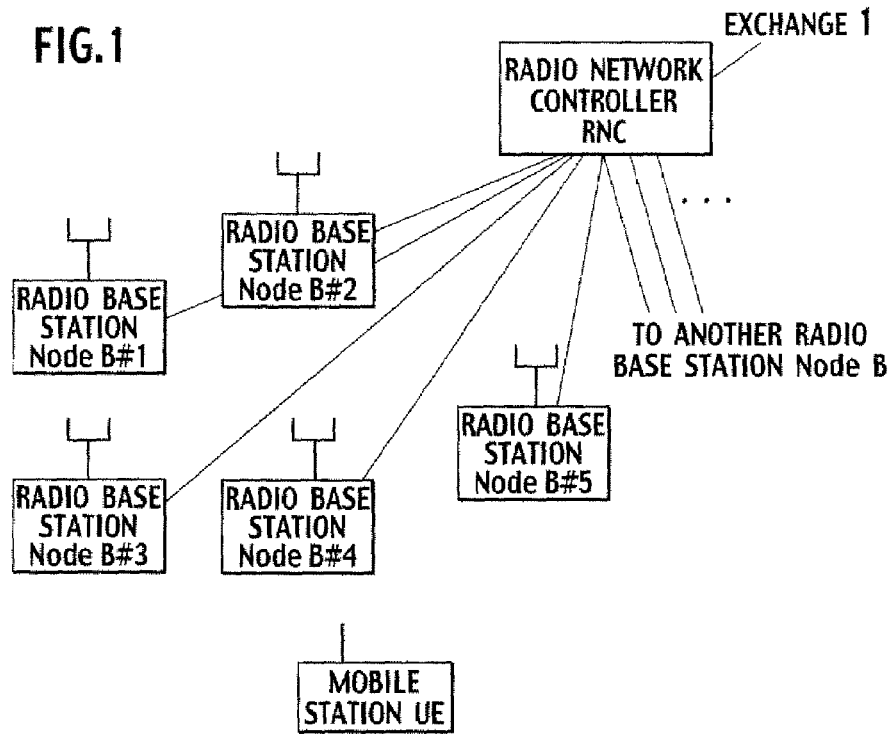
FIG. 1 is diagram of an entire configuration of a general mobile communication system.
Figure 2:
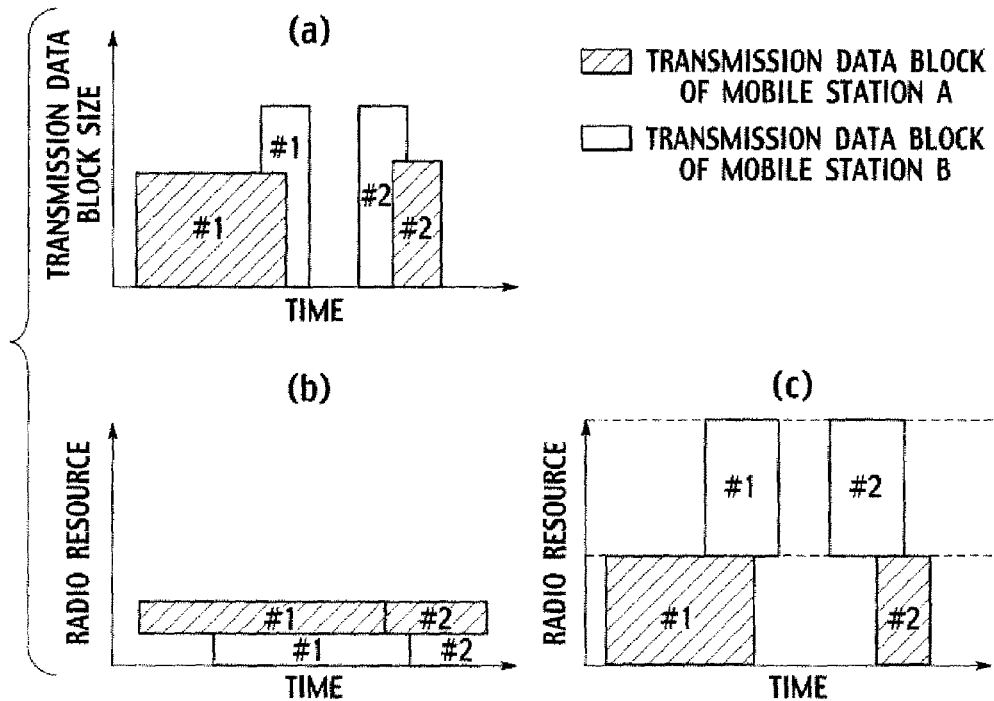
FIGS. 2(a) to 2(c) are graphs illustrating operations at the time of burst data transmission in a conventional mobile communication system.

It should be noted that, as shown in FIG. 1, the mobile communication system according to this embodiment is provided with a plurality of radio base stations Node B #1 to Node B #5 and a radio network controller RNC.

The mobile communication system according to this embodiment is configured to control a transmission rate of user data that is transmitted by a mobile station UE via an uplink.

In addition, in the mobile communication system according to this embodiment, a "High Speed Downlink Packet Access (HSDPA)" is used in a downlink, and an "Enhanced Uplink (EUL)" is used in an uplink.

It should be noted that in both of the HSDPA and the EUL, retransmission control (N process stop and wait) shall be performed by a "Hybrid Automatic Repeat Request (HARQ)".

Therefore, in an uplink, an "Enhanced Dedicated Physical Channel (E-DPCH)" configured of an "Enhanced Dedicated Physical Data Channel (E-DPDCH)" and an "Enhanced Dedicated Physical Control Channel (E-DPCCH)", and a "Dedicated Physical Channel (DPCH)" configured of a "Dedicated Physical Date Channel (DPDCH)" and a "Dedicated Physical Control Channel (DPCCH)" are used.

Here, the E-DPCCH transmits control data for the EUL such as a transmission format number for defining a transmission format (transmission block size, or the like) of the EDPDCH, HARQ related information (the number of retransmission, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a downlink power control bit in a downlink.

In addition, the DPDCH is paired with the DPCCH, and transmits user data for the mobile station UE based on the control data transmitted through the DPCCH. However, if user data that should be transmitted does not exist in the mobile station UE, the DPDCH can be configured not to be transmitted.

In addition, in the uplink, a "High Speed Dedicated Physical Control Channel (HS-DPCCH)" which are needed when the HSPDA is applied, and a "Random Access Channel (RACH)", are also used.

The HS-DPCCH transmits a Channel Quality Indicator (CQI) in a downlink and an acknowledge signal (Ack or Nack) for the HS-DPCCH.

Figure 5:
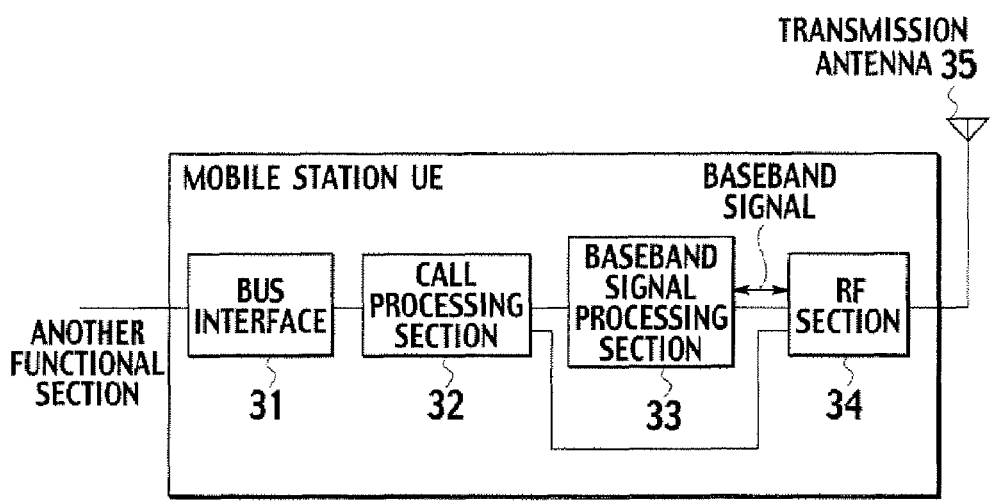
FIG. 5 is a functional block diagram of a mobile station in the mobile communication system according to an embodiment of the present invention.

As shown in FIG. 5, the mobile station UE according to this embodiment is provided with a bus interface 31, a call processing section 32, a baseband processing section 33, a radio frequency (RF) section 34, and a transmission—reception antenna 35.

However, these functions can be independently present as hardware, and can be partly or entirely integrated, or can be configured through a process of software.

The bus interface 31 is configured to forward the user data output from the call processing section 32 to another functional section (for example, an application related functional section). In addition, the bus interface 31 is configured to forward the user data transmitted from another functional section (for example, the application related functional section) to the call processing section 32.

The call processing section 32 is configured to perform a call control processing for transmitting and receiving the user data.

The baseband signal processing section 33 is configured to transmit the user data to the call processing section 32, the user data acquired by performing, against the baseband signals transmitted from the RF section 34, a layer-1 processing including a despreading processing, a RAKE combining processing, and a "Forward Error Correction (FEC)" decode processing, a "Media Access Control (MAC)" processing including a MAC-e processing and a MAC-d processing, and a "Radio Link Control (RLC)" processing.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission—reception antenna 35, so as to transmit the generated baseband signals to the baseband signal processing section 33.

In addition, the RF section 34 is configured to convert the baseband signals transmitted from the baseband signal processing section 33 to the radio frequency signals.

Figure 6:
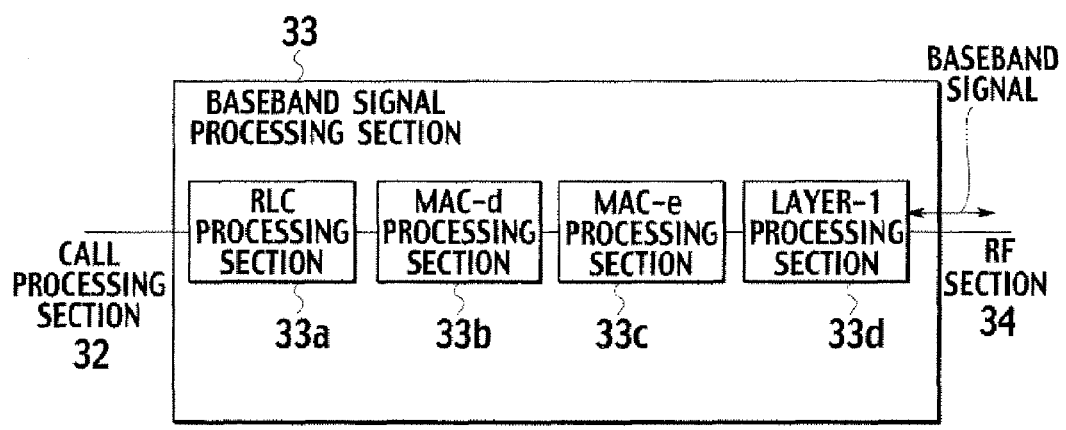
FIG. 6 is a functional block diagram of a baseband signal processing section of the mobile station in the mobile communication system according to the embodiment of the present invention.

As shown in FIG. 6, the baseband signal processing section 33 is provided with a RLC processing section 33a, a MAC-d processing section 33b, a MAC-e processing section 33c, and a layer-1 processing section 33d.

The RLC processing section 33a is configured to transmit, to the MAC-d processing section 33b, the user data transmitted from the call processing section 32 by performing a processing (RLC processing) in an upper layer of a layer-2 against the user data.

The MAC-d processing section 33b is configured to grant a channel identifier header, and to create a transmission format in the uplink based on the limitation of transmission power.

Figure 7:
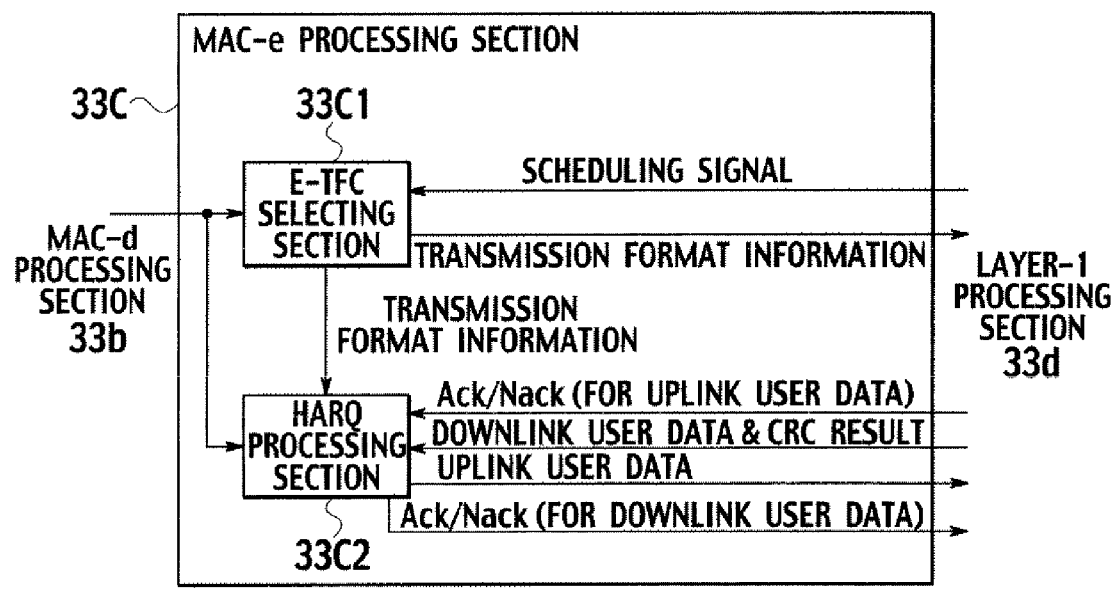
FIG. 7 is a functional block diagram of a MAC-e processing section of the baseband signal processing section in the mobile station of the mobile communication system according to the embodiment of the present invention.

As shown in FIG. 7, the MAC-e processing section 33c is provided with an Enhanced Transport Format Combination (E-TFC) selecting section 33c1 and an HARQ processing section 33c2.

The E-TFC selecting section 33c1 is configured to determine a transmission format (E-TFC) of the E-DPDCH and the E-DPCCH, based on scheduling signals transmitted from the radio base station Node B.

In addition, the E-TFC selecting section 33c1 is configured to transmit transmission format information on the determined transmission format (that is, a transmission data block size, an transmission power ratio between the E-DPDCH and the DPCCH, or the like) to the layer-1 processing section 33d, and also to transmit the determined transmission data block size or the transmission power ratio to the HARQ processing section 33c2.

Here, the scheduling signals include the maximum allowable transmission rate of user data in the mobile station UE (for example, the block size of maximum allowable transmission data, a maximum value of the transmission power ratio between the E-DPDCH and the DPCCH (maximum allowable transmission power ratio), or the like), or a parameter relating to the maximum allowable transmission rate.

Unless particularly described in this specification, the maximum allowable transmission rate includes a parameter relating to the maximum allowable transmission rate.

Such a scheduling signal is information that is signaled in the cell where the mobile station UE is located, and includes control information for all the mobile stations located in the cell, or a specific group of the mobile stations located in the cell.

Here, the E-TFC selecting section 33c1 is configured to increase the transmission rate of user data in the uplink to the maximum allowable transmission rate notified by the scheduling signals from the radio base station Node B.

The HARQ processing section 33c2 is configured to perform process control for the "N-process stop-and-wait", so as to transmit the user data in the uplink based on an acknowledge signal (Ack/Nack for uplink data) transmitted from the radio base station Node B.

Specifically, the HARQ 33c2 is configured to determine whether or not the receive processing of downlink user data has been successful based on the result of the "Cyclic Redundancy Check (CRC)" entered from the first layer processing section 33d.

Then, the HARQ processing section 33c2 is configured to generate an acknowledge signal (Ack/Nack for downlink user data) based on the determined result, so as to transmit the acknowledge signal to the layer-1 processing section 33d.

In addition, the HARQ processing section 33c2 is configured to transmit, to the MAC-d processing 33b, the downlink user data entered from the layer-1 processing section 33d when the above-described determination result has been successful.

Figures 8, 9:
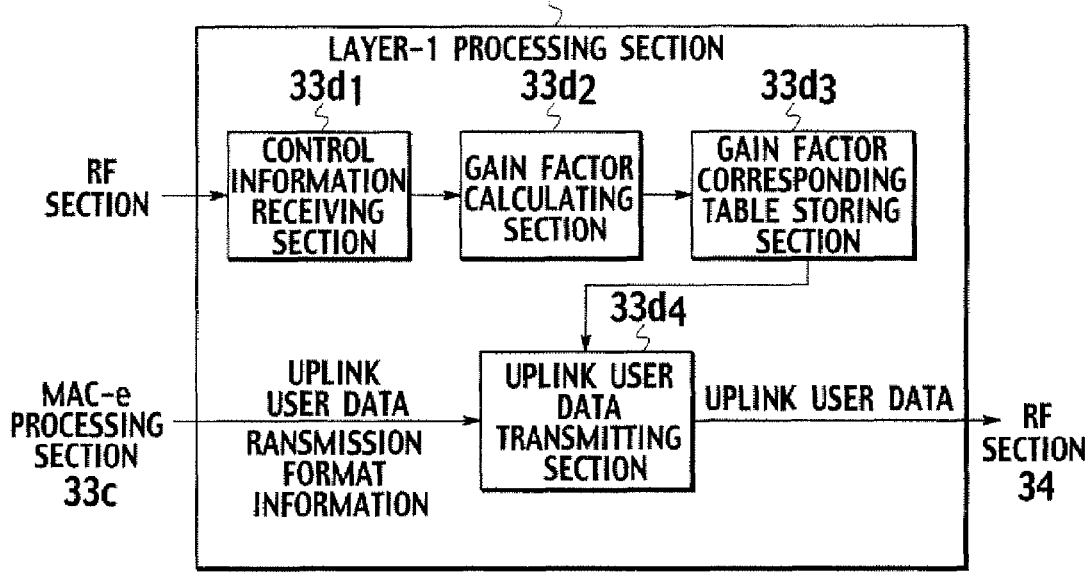
FIG. 8 is a functional block diagram of a layer-1 processing section of the baseband signal processing section in the mobile station of the mobile communication system according to the embodiment of the present invention.
FIG. 9 is a graph for illustrating aspect of calculating a gain factor of a normal transmission format by a gain factor calculating section in the layer-1 processing section of the baseband signal processing section in the mobile station of the mobile communication system according to the embodiment of the present invention.

In addition, as shown in FIG. 8, the layer-1 processing section 33d is provided with a control information receiving section 33d1, a gain factor calculating section 33d2, a gain factor correspondence table storing section 33d3, and an uplink user data transmitting section 33d4.

The control information receiving section 33d1 is configured to receive control information from the radio network controller RNC. Here, the control information includes a layer-3 message, which is notified at the timing of call connection, and the like.

Further, the control information receiving section 33d1 is configured to transmit, to the gain factor calculating section 33d2, a transmission data block size and a gain factor of a reference transmission format extracted from the received control information.

The gain factor calculating section 33d2 is configured to calculate a gain factor of a normal transmission format, based on a predetermined calculating formula, and a transmission data block size and a gain factor of the reference transmission format.

Referring to FIG. 9, the aspect of calculating a gain factor of the normal transmission format by a gain factor calculating section 33d2 will be described below.

As shown in FIG. 9, the gain factor calculating section 33d2 is configured to calculate the gain factor of the normal transmission format (transmission format number 1,2,4 and 5) having the transmission data block size smaller than the second smallest transmission data block size of the reference transmission format (transmission format number 6), based on the reference transmission format (transmission format number 3) having the smallest transmission data block size.

Specifically, the gain factor calculating section 33d2 is configured to complete a gain factor correspondence table by calculating the gain factor of the normal transmission format which is shown as a blank in FIG. 9, in reference to the gain factor of transmission format number for reference, so as to transmit the gain factor correspondence table to the gain factor correspondence table storing section 33d3.

The gain factor correspondence table storing section 33d3 is configured to store the reference transmission format which gives correspondence between the transmission format number, the transmission data block size, and the gain factor, and the normal transmission format which gives correspondence between the transmission format number, the transmission data block size, and the gain factor.

Here, in the gain factor correspondence table storing section 33d3, the transmission format having a smallest transmission data block size is not used for a reference transmission format.

In other words, in the gain factor correspondence table storing section 33d3, a transmission data block size of the reference transmission format is larger than the smallest transmission data block size.

For example, the mobile station UE, the radio network controller RNC or any other device include means for selecting or defining a transmission format having a transmission data block size larger than the smallest transmission data block size, as the reference transmission format, in the gain factor correspondence table storing section 33d3. The uplink user data transmitting section 33d4 is configured to extract, from the gain factor correspondence table storing section 33d3, a gain factor which is corresponding to transmission format information transmitted from the upper layer (transmission data block size, transmission format number, and the like).

Based on the extracted gain factor, the uplink user data transmitting section 33d4 is configured to control transmission power of an enhanced dedicated physical data channel for transmitting uplink user data.

Figure 10:
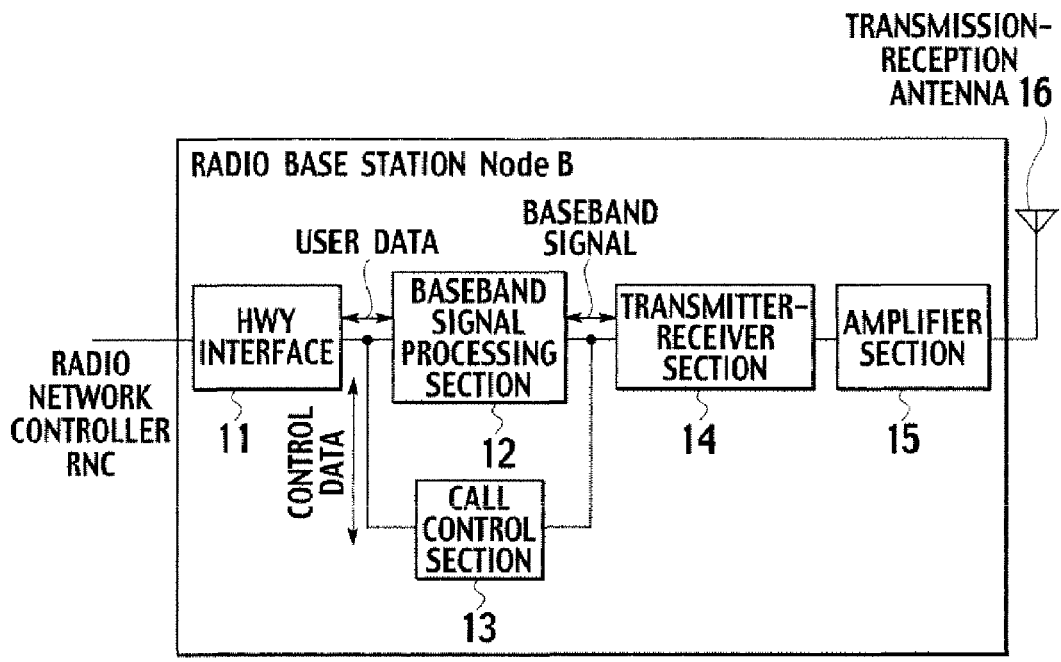
FIG. 10 is a functional block diagram of a radio base station of the mobile communication system according to the embodiment of the present invention.

As shown in FIG. 10, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station UE via a downlink, so as to enter the user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data included in the uplink signals which are received from a mobile station UE via an uplink, so as to transmit the acquired user data to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the RLC processing, the MAC processing (the MAC-d processing and the MAC-e processing), or the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like.

In addition, the layer-1 processing in the downlink includes a channel coding processing of user data, a spreading processing, or the like.

In addition, the baseband signal processing section 12 is configured to extract user data by performing the layer-1 processing, the MAC processing (the MAC-e processing and the MAC-d processing), or the RLC processing against the baseband signals acquired from the transmitter-receiver section 14, so as to forward the extracted user data to the HWY interface 11.

Here, the MAC-e processing in the uplink includes the HARQ processing, the scheduling processing, the transmission rate control processing, a header disposal processing, or the like.

In addition, the layer-1 processing in the uplink includes the despreading processing, the RAKE combining processing, the error correction decode processing, or the like.

The transmitter-receiver section 14 is configured to perform processing of converting baseband signals, which are acquired from the baseband signal processing section 12, to radio frequency signals (downlink signals), so as to transmit the radio frequency signals to the amplifier section 15.

In addition, the transmitter-receiver 14 is configured to perform processing of converting the radio frequency signals (uplink signals), which are acquired from the amplifier section 15, to the baseband signals, so as to transmit the baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16.

In addition, the amplifier 15 is configured to amplify the uplink signals received by the transmission-reception antenna 16, so as to transmit the amplified uplink signals to the transmitter-receiver section 14.

Figure 11:
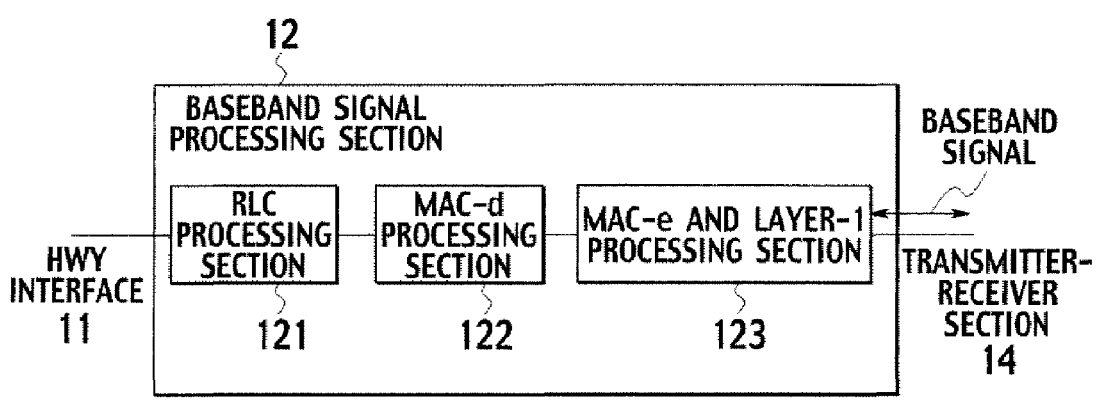
FIG. 11 is a functional block diagram of a baseband processing section in the radio base station of the mobile communication system according to the embodiment of the present invention.

As shown in FIG. 11, the baseband signal processing section 12 is provided with a RLC processing section 121, a MAC-d processing section 122, and a MAC-e and first layer processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

The MAC-d processing section 122 is configured to perform a header disposal processing against output signals from the MAC-e and layer-1 processing section 123.

The RLC processing section 121 is configured to perform, against the output signals from the MAC-d processing section 122, the retransmission control processing in the RLC layer or the reestablishment processing of RLC-Service Data Section (SDU).

However, these functions are not clearly divided per hardware, and can be obtained by software.

Figure 12:
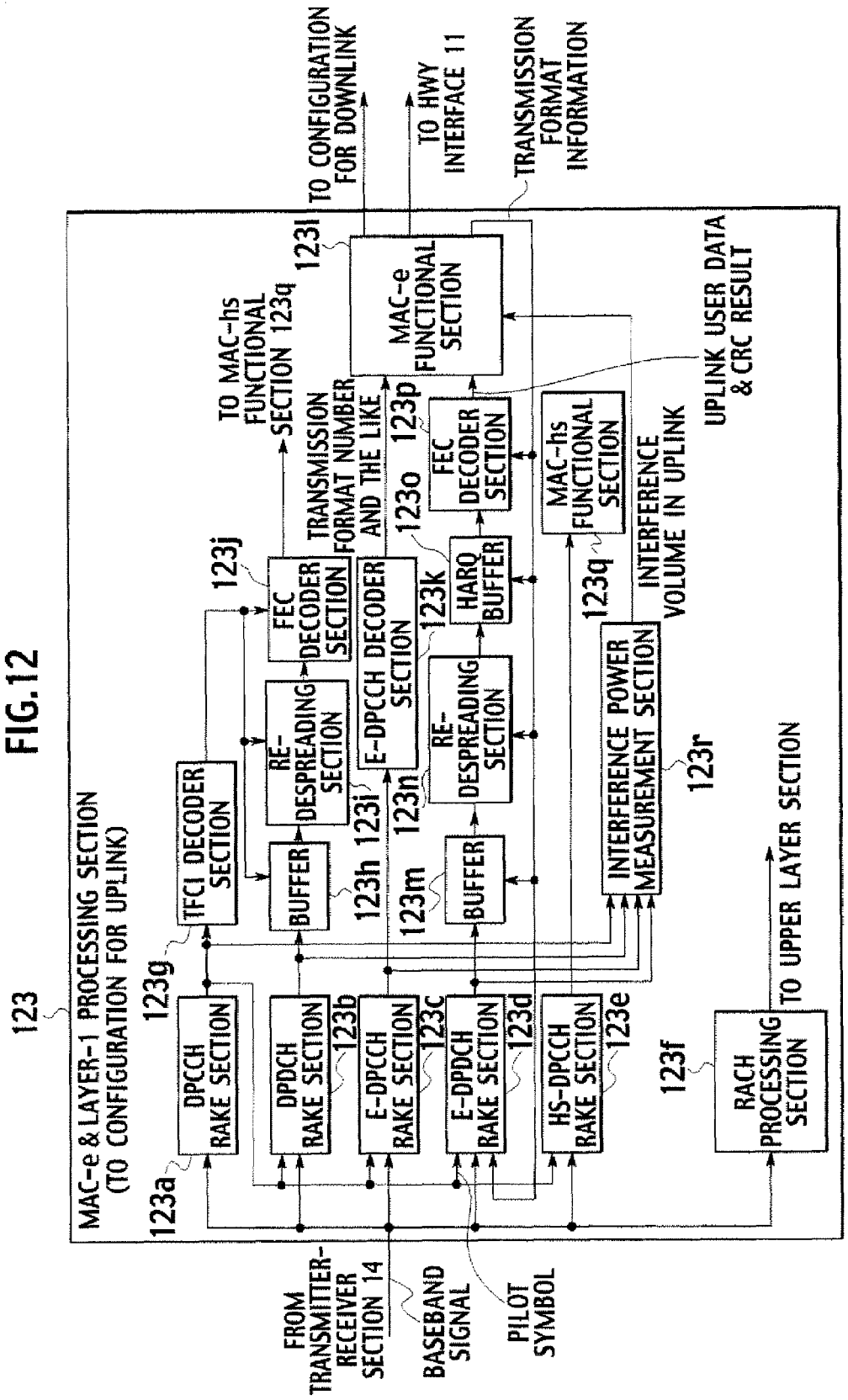
FIG. 12 is a functional block diagram of a MAC-e and layer-1 processing section (configured for an uplink) in the baseband signal processing section in the radio base station of the communication system according to the embodiment of the present invention.

As shown in FIG. 12, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, a RACH processing section 123f, a Transport Format Combination Indicator (TFCI) decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, a MAC-hs functional section 123q, and an interference power measurement section 123r.

The E-DPCCH RAKE section 123c is configured to perform, against the E-DPCCH in the baseband signals transmitted from the transmitter-receiver section 14, the despreading processing and the RAKE combining processing using a pilot symbol included in the DPCCH.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to enter the information to the MAC-e functional section 123l.

The E-DPDCH RAKE section 123d is configured to perform, against the E-DPDCH in the baseband signals transmitted from the transmitter-receiver section 14, the despreading processing using the transmission format information (the number of codes) transmitted from the MAC-e functional section 123l and the RAKE combining processing using the pilot symbol included in the DPCCH.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform the despreading processing against the RAKE combining outputs of the E-DPDCH RAKE section 123d, based on the transmission format information (spreading factor) transmitted from the MAC-e functional section 123l.

The HARQ buffer 123o is configured to store the despreading processing outputs of the re-despreading section 123n, based on the transmission format information transmitted from the MAC-e functional section 123l.

The FEC decoder section 123p is configured to perform an error correction decoding processing (the FEC decode processing) against the despreading processing outputs of the re-despreading section 123n, which is stored in the HARQ buffer 123o, based on the transmission format information (transmission data block size) transmitted from the MAC-e functional section 123l.

The interference power measurement section 123r is configured to measure an interference volume (noise rise) in the uplink such as interference power by a mobile station UE whose cell serves as a servicing cell, and the entire interference power.

Here, the noise rise is a ratio between the interference power in a predetermined channel within a predetermined frequency and noise power (thermal noise power or noise power from the outside of the mobile communication system) within the predetermined frequency (i.e., a receiving level from a noise floor).

In other words, the noise rise is a received interference power offset that a receiving level in communication has against a receiving level (noise floor) in non-communication.

The MAC-e functional section 123l is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123k.

Figure 13:
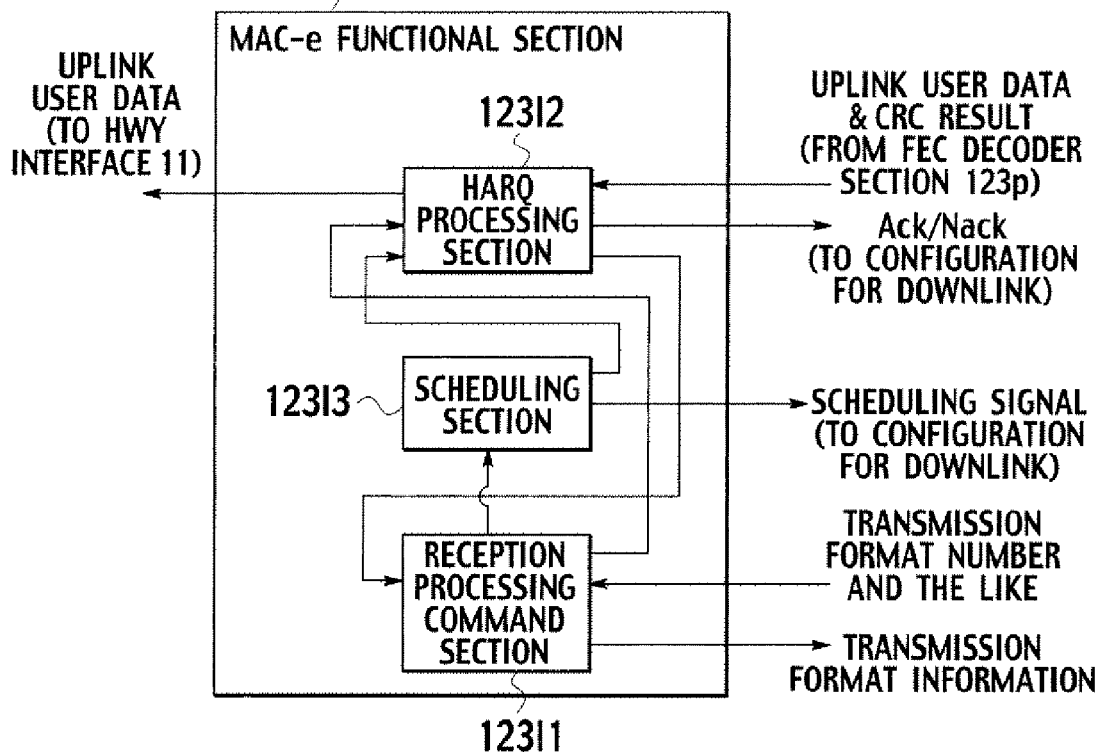
FIG. 13 is a functional block diagram of the MAC-e functional section of the MAC-e and layer-1 processing section (configured for the uplink) in the baseband signal processing section in the radio base station of the mobile communication system according to the embodiment of the present invention.

In addition, as shown in FIG. 13, the MAC-e functional section 123l is provided with a receive processing command section 123l/1, an HARQ controlling section 123l/2, and a scheduling section 123l/3.

The receive processing command section 123l/1 is configured to transmit the transmission format number related information, the HARQ related information, and the scheduling related information, which are entered from the E-DPCCH decoder section 123k, to the HARQ controlling section 123l/2.

In addition, the receive processing command section 123l/1 is configured to transmit, to the scheduling section 123l/3, the scheduling related information entered from the E-DPCCH decoder 123k.

Further, the receive processing command section 123l/1 is configured to output the transmission format information corresponding to the transmission format number entered from the E-DPCCH decoder section 123k.

The HARQ controlling section 123l/2 is configured to determine whether or not the receive processing of uplink user data has been successful, based on the result of CRC entered from the FEC decoder section 123p.

Then, the HARQ controlling section 123l/2 is configured to generate an acknowledge signal (Ack or Nack), based on the determination result, so as to transmit the generated acknowledge signal to the configuration for the downlink of the baseband signal processing section 12.

In addition, the HARQ controlling section 123l/2 is configured to transmit the uplink user data entered from the FEC decoder section 123p to the radio network controller RNC, when the above determination result has been successful.

In addition, the HARQ controlling section 123l/2 is configured to clear soft decision values stored in the HARQ buffer 123o, when the above determination result has been successful.

On the other hand, the HARQ controlling section 123l/2 is configured to store, in the HARQ buffer 123o, the uplink user data, when the above determination result has not been successful.

In addition, the HARQ controlling section 123l/2 is configured to forward the above determination result to the receive processing command section 123l/1.

The receive processing control command section 123/1 is configured to notify the E-DPDCH RAKE section 123d and the buffer 123m of an hardware resource that should be prepared for the following transmission time interval (TTI), so as to perform notification for reserving the resource in the HARQ buffer 123o.

In addition, when the uplink user data is stored in the buffer 123m, the receive processing command section 123/1 is configured to designate the HARQ buffer 123o and the FEC decoder section 123p to perform the FEC decoding processing after adding the uplink user data, which is stored in the HARQ buffer 123o, in a process corresponding to the TTI and a newly received uplink user data, per TTI.

In addition, the scheduling section 123/3 is configured to designate the configuration for the downlink of the baseband signal processing section 12 so as to notify the scheduling signals including the maximum allowable transmission rate (maximum allowable transmission data block size, maximum allowable transmission power ratio, or the like), based on radio resources in the uplink of the radio base station Node B, interference volume (noise rise) in the uplink, or the like.

Specifically, the scheduling section 123/3 is configured to determine the maximum allowable transmission rate based on the scheduling related information (radio resources in the uplink) transmitted from the E-DPCCH decoder section 123k or the interference volume in the uplink transmitted from the interference power measurement section 123r, so as to control the transmission rate of user data in a communicating mobile station (a serving mobile station).

In addition, the scheduling section 123/3 is configured to determine the reduction range (i.e., relative value of the maximum allowable transmission rate transmitted by the RGCH) of the above-described maximum allowable transmission rate based on the interference volume in the uplink from the interference power measurement section 123r, and to control the transmission rate of user data in the communicating mobile station (serving mobile station or non-serving mobile station).

The radio network controller RNC according to this embodiment is an apparatus located in an upper level of the radio base station Node B, and is configured to control radio communications between the radio base station Node B and the mobile station UE.

Figure 14:
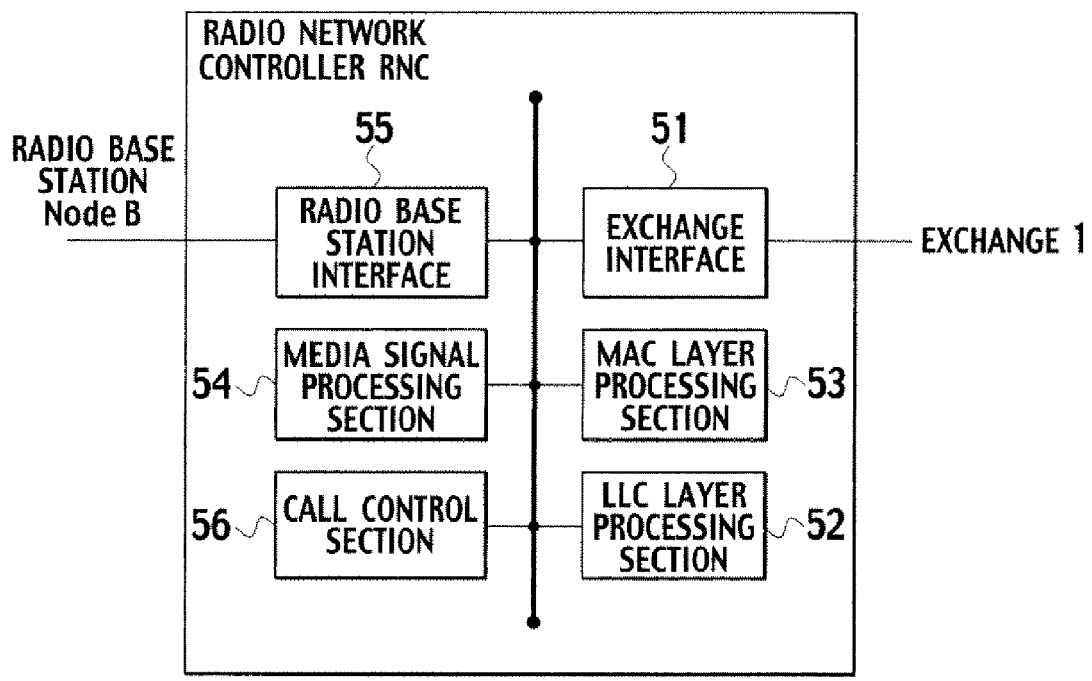
FIG. 14 is a functional block diagram of a radio network controller of the mobile communication system according to the embodiment of the present invention.

As shown in FIG. 14, the radio network controller RNC according to this embodiment is provided with an exchange interface 51, a Logical Link Control (LLC) layer processing section 52, a MAC layer processing section 53, a media signal processing section 54, a radio base station interface 55, and a call control section 56.

The exchange interface 51 is an interface with an exchange 1, and is configured to forward the downlink signals transmitted from the exchange 1 to the LLC layer processing section 52, and to forward the uplink signals transmitted from the LLC layer processing section 52 to the exchange 1.

The LLC layer processing section 52 is configured to perform an LLC sub-layer processing such as a synthesis processing of a header such as a sequence number or a trailer.

The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform a MAC layer processing such as a priority control processing or a header granting processing.

The MAC layer processing section 53 is also configured to transmit the uplink signals to the LLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing for controlling radio resources such as call admission control processing, handover processing, and the like, a channel setup by the layer-3 signaling, and open processing, or the like.

Operations of Mobile Communication System According to First Embodiment of the Present Invention Referring to FIG. 15, operations of the mobile station in the mobile communication system according to the embodiment of the present invention will be described.

Figure 15:
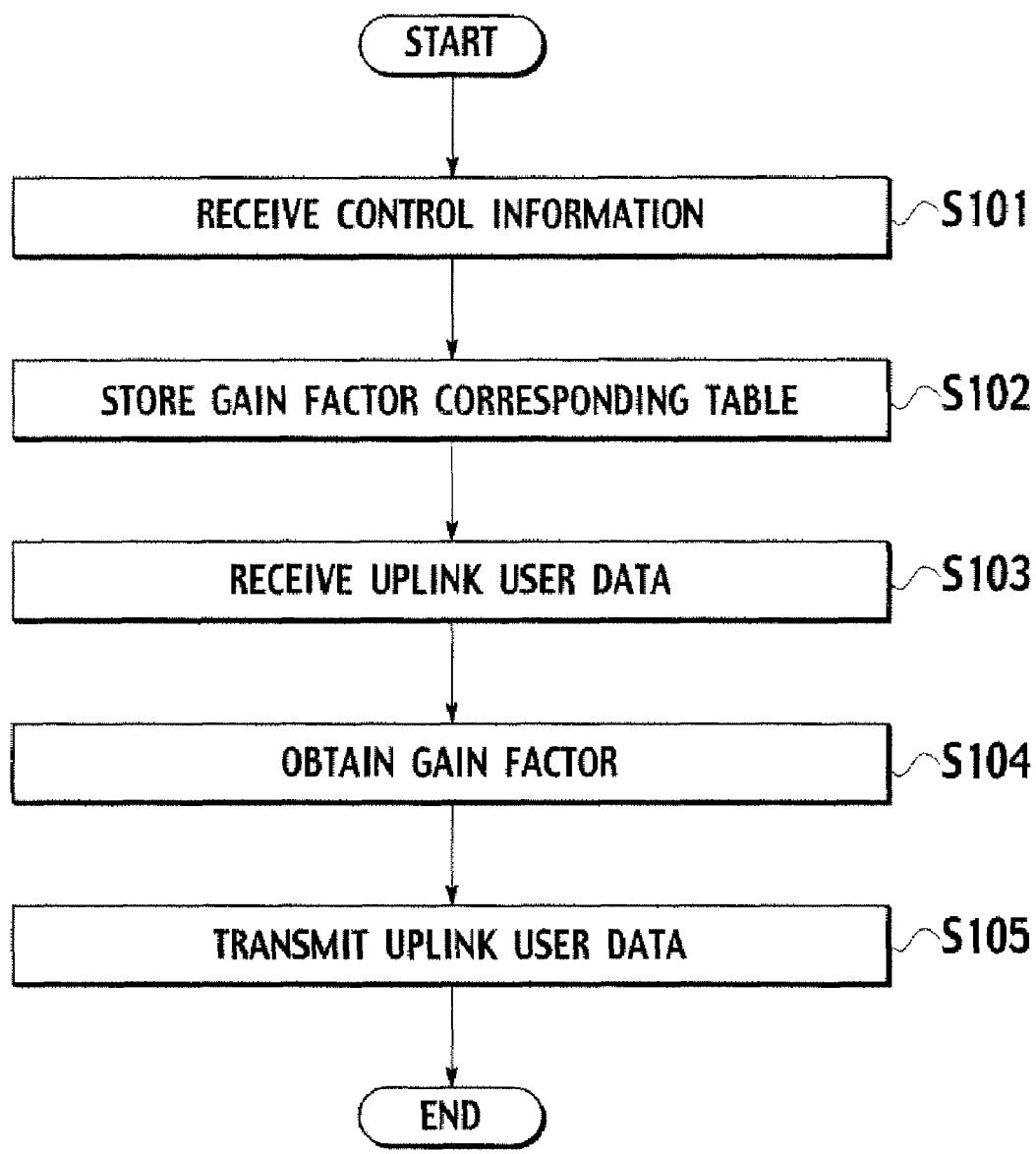
FIG. 15 is a flowchart showing operations of the mobile communication system according to the embodiment of the present invention.

As shown in FIG. 15, in step S101, the mobile station UE receives control information, which is notified from the radio network controller RNC, at the timing of call connection.

In step S102, the mobile station UE stores the reference transmission format including the transmission format number, the transmission data block size and the gain factor, based on the control information from the radio network controller RNC.

At the same time, the mobile station UE calculates the gain factor of the normal transmission format based on the transmission data block size and the gain factor of the reference transmission format, so as to store the normal transmission format including the transmission format number, the transmission data block size, and the gain factor.

In step S103, the mobile station UE receives uplink user data. Then, in step S104, the mobile station UE acquires the gain factor based on the transmission format information to be used for transmitting uplink user data.

In step S105, the mobile station UE determines transmission power of an enhanced dedicated physical data channel based on the acquired gain factor, so as to transmit the uplink user data.

Actions and Effects of Mobile Communication System According to First Embodiment of the Present Invention According to the mobile communication system in accordance with the first embodiment of the present invention, it becomes possible to decrease the number of reference transmission formats, and to achieve the reduction of control signal volume, the reduction of complexity of hardware, the reduction of test operation and the reduction of system operation, by calculating a gain factor of the normal transmission format having the transmission data block size smaller than the second smallest transmission data block size of the reference transmission format, based on the reference transmission format having a smallest transmission data block size. Here, the transmission format having the smallest transmission data block size is not used as the reference transmission format.

The present invention can provide a transmission power control method, a mobile station and a radio network controller, which enable a reduction of complexity of hardware, a reduction of test operation, and a reduction of system operation, even if a gain factor correspondence table, which is generated by using the "Computed Gain Factor" scheme, is used.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission power control method for controlling, based on a plurality of reference transmission format and a plurality of normal transmission format, using an error correction coding process, transmission power of an enhanced dedicated physical data channel for transmitting uplink user data, wherein the reference transmission format includes a reference transmission data block size, and a reference gain factor which indicates a transmission power ratio between the enhanced dedicated physical data channel and a dedicated physical control channel or indicates a transmission wave amplitude ratio between the enhanced dedicated physical data channel and the dedicated physical control channel, and the normal transmission format includes a normal transmission data block size, and a normal gain factor which indicates a transmission power ratio between the enhanced dedicated physical data channel and the dedicated physical control channel or indicates a transmission wave amplitude ratio between the enhanced dedicated physical data channel and the dedicated physical control channel, and the transmission power control method comprises:
determining and storing, at a mobile station, the reference transmission data block size and the reference gain factor for each of the plurality of the reference transmission format and the normal transmission data block size for each of the plurality of the normal transmission format, based on control information transmitted from a radio network controller; and calculating and storing, at the mobile station, the normal gain factor for each of the plurality of normal transmission format including the normal transmission data block size, based on the reference transmission data block size and the reference gain factor included in the certain reference transmission format and the normal transmission data block size, and wherein the mobile station calculates, based on the reference transmission format having the smallest reference transmission data block size, a normal gain factor having the normal transmission data block size smaller than a second smallest reference transmission data block size, when a transmission format having the smallest transmission block size among the stored reference transmission data block size and the stored normal transmission data block size is not set as the reference transmission format.

2. A mobile station used in a transmission power control method for controlling, based on a plurality of reference transmission format and a plurality of normal transmission format, using an error correction coding process, transmission power of an enhanced dedicated physical data channel for transmitting uplink user data, wherein the reference transmission format includes a reference transmission data block size, and a reference gain factor which indicates a transmission power ratio between the enhanced dedicated physical data channel and a dedicated physical control channel or indicates a transmission wave amplitude ratio between the enhanced dedicated physical data channel and the dedicated physical control channel, and the normal transmission format includes a normal transmission data block size, and a normal gain factor which indicates a transmission power ratio between the enhanced dedicated physical data channel and the dedicated physical control channel or indicates a transmission wave amplitude ratio between the enhanced dedicated physical data channel and the dedicated physical control channel, and the mobile station comprises:
a determining section configured to determine and store the reference transmission data block size and the reference gain factor for each of the plurality of the reference transmission format and the normal transmission data block size for each of the plurality of the normal transmission format, based on control information transmitted from a radio network controller; and a calculating section configured to calculate the normal gain factor for each of the plurality of normal transmission format including the normal transmission data block size/ based on the reference transmission data block size and the reference gain factor included in the certain reference transmission format and the normal transmission data block size, and store the calculated normal gain factor to the determining section, and wherein the mobile station calculates, based on the reference transmission format having the smallest reference transmission data block size, a normal gain factor having the normal transmission data block size smaller than a second smallest reference transmission data block size, when a transmission format having the smallest transmission block size among the stored reference transmission data block size and the stored normal transmission data block size is not set as the reference transmission format.

* * * * *